(12) United States Patent
Hayman et al.

(10) Patent No.: US 7,119,544 B2
(45) Date of Patent: Oct. 10, 2006

(54) METHOD AND A TOOL FOR ELECTRICALLY INVESTIGATING A WALL OF A BOREHOLE IN A GEOLOGIC FORMATION

(75) Inventors: Andrew Hayman, Voisins-le-Bretonneux (FR); Philip Cheung, Montesson (FR)

(73) Assignee: Schlumberger Technology Corporation, Sugar Land, TX (US)

(*) Notice: Subject to any disclaimer, the term of this patent is extended or adjusted under 35 U.S.C. 154(b) by 96 days.

(21) Appl. No.: 10/510,320

(22) PCT Filed: Apr. 10, 2003

(86) PCT No.: PCT/EP03/50101

§ 371 (c)(1),
(2), (4) Date: Oct. 4, 2004

(87) PCT Pub. No.: WO03/087883

PCT Pub. Date: Oct. 23, 2003

(65) Prior Publication Data

US 2005/0179437 A1 Aug. 18, 2005

(30) Foreign Application Priority Data

Apr. 17, 2002 (EP) .................................. 02290967

(51) Int. Cl.
*G01V 3/18* (2006.01)

(52) U.S. Cl. ...................... 324/374; 324/367

(58) Field of Classification Search ............... 324/366, 324/347, 355, 367, 373, 374, 375; 702/7, 702/11
See application file for complete search history.

(56) References Cited

U.S. PATENT DOCUMENTS

| 3,017,566 | A | * | 1/1962 | Schuster ..................... 324/374 |
| 3,539,910 | A | | 11/1970 | Henry et al. |
| 4,361,808 | A | | 11/1982 | Kern et al. |
| 5,191,290 | A | * | 3/1993 | Gianzero et al. ........... 324/374 |
| 6,351,129 | B1 | | 2/2002 | Gounot |
| 6,603,314 | B1 | * | 8/2003 | Kostelnicek et al. ........ 324/368 |
| 6,891,377 | B1 | * | 5/2005 | Cheung et al. .............. 324/374 |
| 6,919,724 | B1 | * | 7/2005 | Cheung et al. .............. 324/366 |

FOREIGN PATENT DOCUMENTS

| GB | 930073 | 7/1963 |
| WO | WO 01/77711 | 10/2001 |

* cited by examiner

*Primary Examiner*—Jay M. Patidar
(74) *Attorney, Agent, or Firm*—Victor H. Segura; Brigitte L. Echols

(57) ABSTRACT

A method for electrically investigating a wall of a borehole in a geologic formation including injecting a current into the formation at a first position along the wall and returning the current at a second position along the wall, the formation current having a frequency below about 100 kHz, measuring a voltage in the formation between a third position and a fourth position along the wall, the third and fourth positions being located between the first and second positions, and determining an amplitude of a component of the voltage in phase with the current.

11 Claims, 7 Drawing Sheets

METHOD AND A TOOL FOR ELECTRICALLY INVESTIGATING A WALL OF A BOREHOLE IN A GEOLOGIC FORMATION

BACKGROUND OF INVENTION

1. Field of the Invention

The invention relates generally to exploring for hydrocarbons using electrical investigation. More particularly, the invention relates to a method and apparatus for discriminating against unwanted signals that are dephased from the desired signal.

2. Background Art

When exploring a borehole drilled through an earth formation, it is desirable to know the characteristics of the geologic formation at various depths of the borehole. These characteristics include the stratifications, non-homogenous elements, and the size and shape of pores and breaks in the formation.

One technique for detecting these characteristics uses a tool with a series of current electrodes located on the face of a conductive pad that is pressed against the wall of the borehole. A constant current source injects a measurement current into the formation through a source electrode and returns the current through a return electrode situated on another part of the pad. The pad is moved along the borehole wall, and the discrete current signals associated with each electrode are related to the resistivity of the formation. If, however, a non-conductive drilling fluid ("mud") is used, such as an oil based mud or water-in-oil emulsion type mud, the resulting non-conductive mud layer between the pad and the wellbore wall produces poor and unusable signals.

Another technique can image a borehole drilled with a non-conductive mud. The tool for this technique uses a non-conductive pad with two current injectors and an array of voltage electrodes. The two current injectors, a source electrode and a return electrode, inject a current into the formation, and the current passes through the formation in a path parallel to the pad. The voltage electrodes measure the voltage differential in the formation where the current is passing. This measurement of the voltage is important because the resistivity of the formation is related to the voltage.

The resistivity of the formation can be calculated using the following equation:

$$\rho = \frac{E}{J} \quad (1)$$

where $\rho$ is the resistivity of the formation, E is the electric field in the formation, and J is the current density. The electric field E is given by the differential voltage $\delta V$ divided by the voltage electrode separation, and the current density J is given by the current I divided by a geometric factor g. Substituting for E and J in Equation 1 gives:

$$\rho = k\frac{\delta V}{I} \quad (2)$$

where k is a geometric factor with units of length. Thus, the resistivity of a formation can be determined by injecting a current into the formation, measuring a voltage, and computing the resistivity of the formation using Equation 2.

The prior art pad used in this method is shown in FIGS. 1A and 1B. The pad is shown generally in FIG. 1 at element 1. It contains a source electrode 2, a return electrode 3, and an array of pairs of voltage electrodes 4. The pad 1 itself is constructed of a non-conductive, insulative material 5, such as ceramics or polymers, that have a high strength, and high chemical and thermal stability.

The pad 1 is placed against the wall of a borehole 7, which may have a mud cake layer 6. An electrical current is injected into the formation 8 through the source electrode 2, returning at the return electrode 3. The voltage electrodes 4 measure a voltage in the formation 8, and the resistivity of the formation can be calculated using Equation 2, above.

When the pad 1 is not in contact with the borehole wall 7, the distance between the pad 1 and the borehole wall 7 is called "standoff." There are three main standoff effects: (1) mud and pad signals, (2) current leakage, and (3) voltage inaccuracies. There are various ways to reduce these effects so that accurate measurements can be made even when the pad 1 is not in direct contact with the borehole wall 7.

The current electrodes 2, 3 generate an electric field in the mud and in the insulating pad 5 which is detected by the voltage electrodes 4. One tool to reduce pad signal, shown in FIG. 9B, has a conductive backplate 92 behind the insulating pad 5 and parallel to the front face of the tool 1. The backplate 92 is maintained at an electrical potential equal to that of the formation in front of the voltage electrodes 4. This technique is described in Patent WO 0177711. This shields the array of voltage electrodes from the mud and pad signals.

"Current leakage" describes the condition when not all of the current injected from the source electrode 2 passes through the formation 8, referring to FIG. 1A. Ideally, when the pad 1 makes good contact with the borehole wall 7, the injected current passes almost entirely through the formation 8. But when mud or a mud cake layer 6 lies under one or both current electrodes 2, 3, when there is significant standoff, part of the current, called leakage current, will leak by capacitive coupling from the source electrode 2 to the return electrode 3, without passing through the formation 8. This situation is shown in the model circuit in FIG. 2.

FIG. 2 shows a current source 21 modeled to be in a parallel circuit with a leakage impedance $Z_L$ and a variable mud impedance $Z_M$. The formation current $I_F$ passes through the impedance of the mud or mud cake layer and through the formation. The leakage current $I_L$ passes through the leakage impedance $Z_L$, but does not pass through the formation. When calculating the resistivity of the formation, the formation current must be used in Equation 2.

The leakage current $I_L$ and the formation current $I_F$ sum to the total current I. Thus, the formation current is given by:

$$I_F = I - I_L \quad (3)$$

Using $Z=(V/I)$, the above equation can be transformed into a more useful form:

$$I_F = I\left[1 - \frac{Z_{INJ}}{Z_L}\right] \quad (4)$$

where $Z_{INJ}$ is the total impedance seen by the injector circuit, as measured by the tool, and $Z_L$ is the leakage impedance of the tool, which can be experimentally determined. Thus, the formation current $I_F$ can be computed from the injection voltage and current, without knowing the formation impedance $Z_F$, standoff, or mud properties. An alternative method for determining the true current in the formation is to use injection electrodes 2,3 that are shielded by a conductive box, where the shields are maintained at the same electric potential as each electrode, as described in Patent WO 0177710.

Errors in the voltage measurement occur because the voltage electrodes 4 couple not only to the formation but also to the conductive backplate. The voltage output from the electrodes is given by:

$$\delta V = \delta V_{TRUE} \frac{Z_S}{Z_S + Z_C} \quad (5)$$

where $\delta V_{TRUE}$ is the true voltage in the formation, $Z_S$ is the coupling impedance to the backplate and $Z_C$ is the contact impedance between the voltage electrodes and the formation. A scalar correction is obtained by solving for $\delta V_{TRUE}$:

$$\delta V_{TRUE} = \delta V \left( 1 + \frac{Z_C}{Z_S} \right) \quad (6)$$

FIG. 4 is a diagram of an equivalent circuit showing the current flow using the prior art tool. It is similar to FIG. 2, but shows more detail along the path of the formation current $I_F$. FIG. 4 shows the mud impedance $Z_M$ of FIG. 2 to be a series containing a mud impedance at the upper or source electrode $Z_{MU}$, a formation resistance $R_F$, and a mud impedance at the lower or return electrode $Z_{ML}$. Thus, the formation current flows through the formation resistance $R_F$ via the two mud impedances $Z_{MU}$, $Z_{ML}$.

To a first approximation, the contact impedance of a voltage electrode $Z_C$ is linearly proportional to the mean contact impedance of the current injection electrodes:

$$Z_C = \left( \frac{Z_{MU} + Z_{ML}}{2} \right) \cdot \left( \frac{A_{INJ}}{A_{BUT}} \right) \quad (7)$$

where $A_{INJ}$ is the current injector 2, 3 area and $A_{but}$ is the voltage electrode 4 (button) area.

Because the mud impedances under the injectors $Z_{MU}$, $Z_{ML}$ are usually much greater than the impedance of the formation $R_F$, V=IR can be rewritten as:

$$Z_{MU} + Z_{ML} \approx \frac{V}{I_F} \quad (8)$$

where $I_F$ is given by Equation 4 and V is the voltage difference across the current electrodes 2, 3. Thus, $\delta V_{TRUE}$ can be calculated from V and I without knowing the standoff or mud properties.

FIGS. 3A and 3B show experimental resistivity data. FIG. 3A shows raw, uncorrected data in two different mud types, a 90/10 oil to water ratio mud and a 50/50 ratio mud, and with two different formations of mown resistivity, 20 Ω-m and 200 Ω-m Data with a conductive steel casing are also shown. The casing data lines represent the signal in the mud and shows how the mud signal affects the measured resistivity as the standoff increases. At large standoffs, the measured signal is composed almost entirely of the mud signal and not the formation signal. FIG. 3B shows the resistivity data after applying the scalar correction in Equations 4 and 6. The scalar corrected resistivity curves in the two formations are more accurate in the range from no standoff to the point on each curve where the mud signal becomes dominant, but at large standoff the mud signal overwhelms the formation signal and the data are unusable.

SUMMARY OF INVENTION

One aspect of the invention is a method for electrically investigating a wall borehole in a geologic formation that includes injecting a current into the formation at a first position on the wall, returning the current at a second position on the wall, and measuring the voltage between a third and fourth position that are located between the first and second positions. The method includes determining a component of the voltage in phase with the current. In one embodiment, the invention also includes calculating the formation resistivity based on the current and the component of the voltage in phase with the current. In some other embodiments, the invention includes applying a scalar correction for the current leakage and voltage inaccuracies.

The well-logging tool according to the invention includes a pad adapted to be placed into contact with a wall of a borehole, a source electrode located on the pad and adapted to inject an electrical current into the formation, a return electrode also located on the pad and adapted to receive the current injected by the source electrode, an ammeter operatively coupled to the electrode circuit, at least one pair of voltage electrodes located on the front face of the pad in between the source and return electrodes, and a phase sensitive detector operatively coupled to the voltage electrodes and adapted to measure an amplitude of a component of the voltage in phase with the electrical current. In one embodiment the pad is comprised of a non-conductive material and has a conductive back plate disposed on the back face of the pad. Other aspects and advantages of the invention will be apparent from the following description and the appended claims.

DETAILED DESCRIPTION

The present invention includes a new method and apparatus for discriminating against unwanted signals when making microeletric investigations of a borehole wall. The invention is based on the electric properties exhibited by the materials near the voltage electrodes, when the frequency of the alternating current source is below about 100 kHz.

First, below about 100 kHz, most geologic formations can be treated as purely resistive materials. That is, the electrical permittivity of the formation can be neglected:

$$\sigma >> 2\pi f \in_0 \in_r \quad (9)$$

where $\sigma$ is the conductivity of the formation, f is the frequency of the injected alternating current, $\in_0$ is the permittivity of free space, and $\in_r$ is the relative permittivity of the formation.

Second, below about 100 kHz, the insulating materials surrounding the current electrodes can be treated as pure dielectrics. That is, the conductivity of the insulating materials can be neglected.

$$2\pi f \in_0 \in_r >> \sigma \quad (10)$$

Finally, the drilling mud can be treated as a leaky dielectric with:

$$2\pi f \in_0 \in_r > \sigma \quad (11)$$

or $$2\pi f \in_0 \in_r \approx \sigma \quad (12)$$

Figure 4:
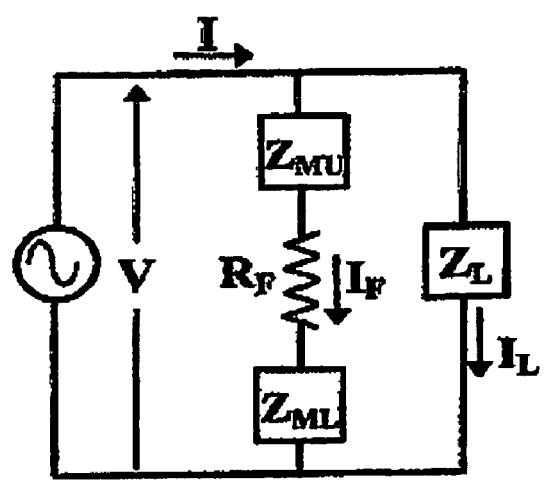
FIG. 4 is a model circuit diagram showing the path of the current using the prior art tool.

Because of the dielectric nature of the drilling mud and the insulators, all of the impedances shown in FIG. 4 are complex impedances equivalent to parallel combinations of resistors and capacitors, where the capacitive part is dominant. As a result, while the potential difference generated in the formation will be in phase with the formation current $I_F$, the potential differences generated in the leakage paths, because of the capacitive nature of the leakage impedances, will be dephased from the formation current by an angle between 0° and −90°.

Using this phenomenon, the formation signal can be partially discriminated from the fluid and insulator signals. This can be achieved using the following equation:

$$\delta V_{phase} = \delta V \cdot \cos(\phi_F) \quad (13)$$

where $\phi_F$ is the phase of the voltage $\delta V$ with respect to the formation current $I_F$. The formation current and its phase can be measured using shielded current injectors, as described in the Background and Patent WO 017710, or they can be calculated based on the equivalent circuit in FIG. 4, by independently measuring the leakage impedance $Z_L$ and assuming it to be constant.

Further, experimental data have shown that for practical purposes, it is sufficient to measure the phase of the total current I and use the component of the voltage $\delta V$ in phase with the total current. This, the above equation simplifies to:

$$\delta V_{phase} = \delta V \cdot \cos(\phi) \quad (1-4)$$

where $\phi$ is the phase of $\delta V$ with respect to the total current I.

Figure 3A:
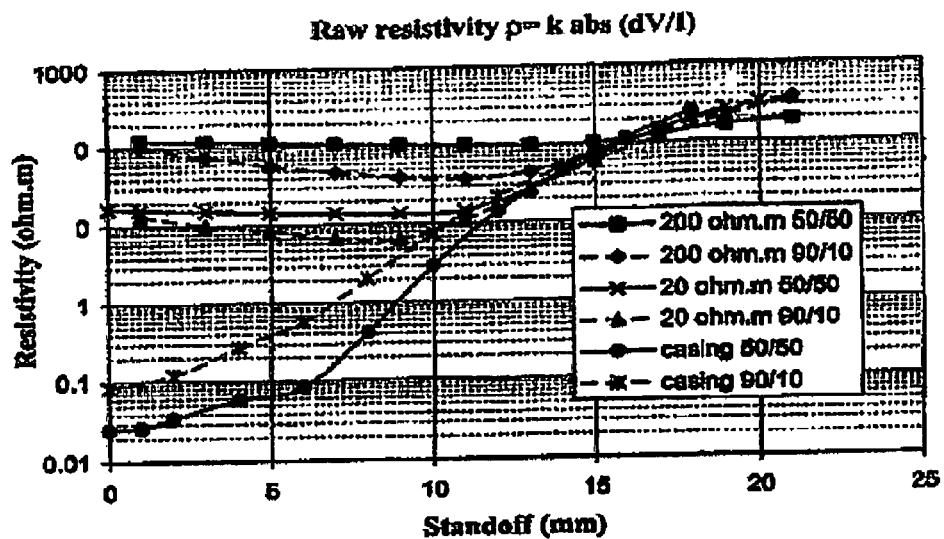
FIG. 3A shows a graph of raw resistivity data.
Figure 3B:
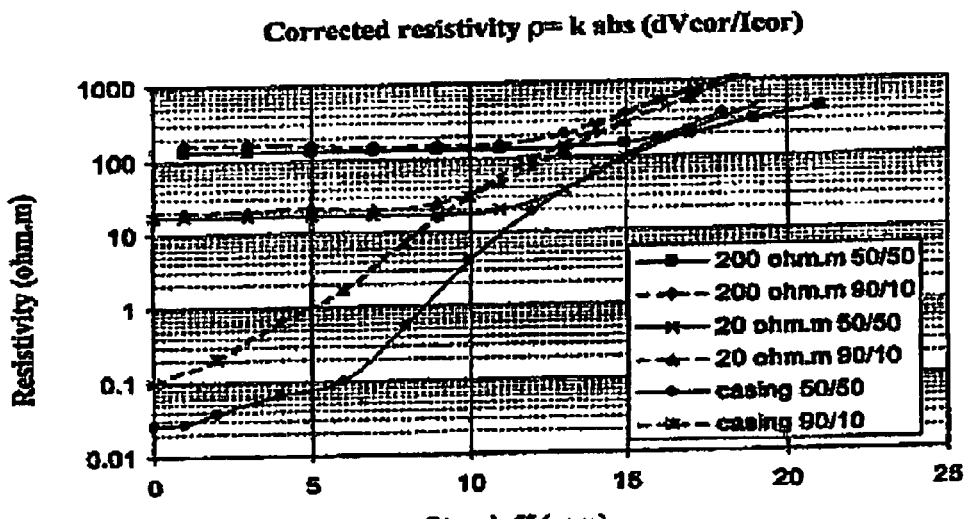
FIG. 3B is a graph of resistivity data after a prior art scalar correction.
Figure 5:
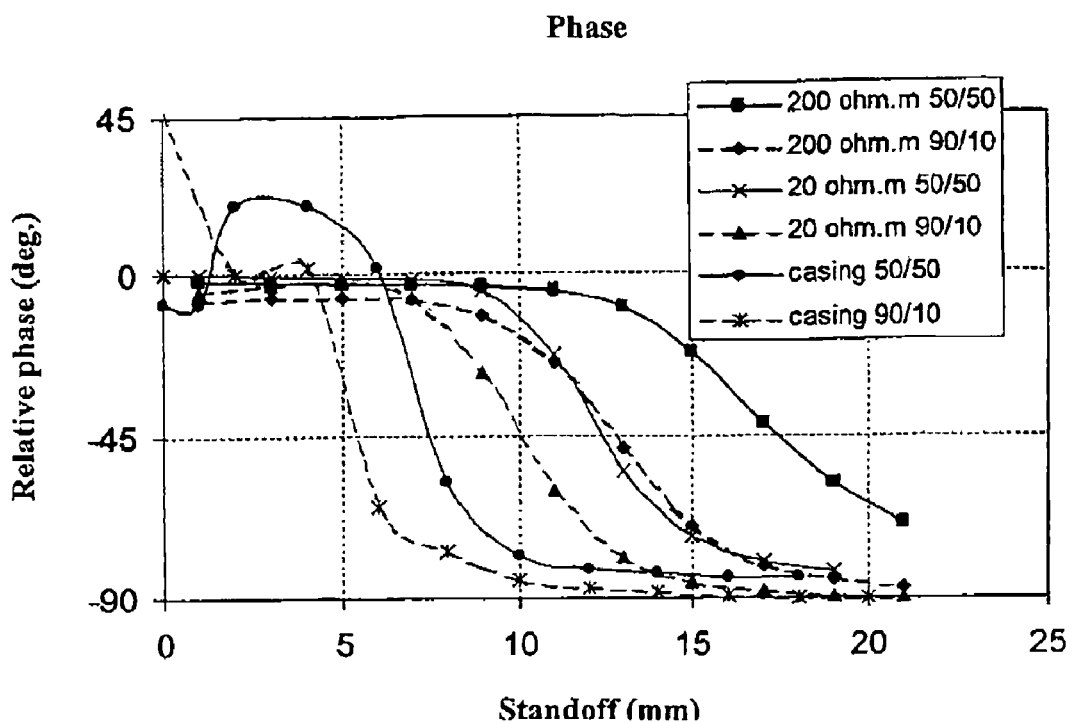
FIG. 5 is a graph that shows the dephasing of the voltage relative to the formation current as a function of standoff.

FIG. 5 shows the measured phase of the voltage $\delta V$ relative to the formation current I as a function of standoff. As with FIGS. 3A and 3B, the graph in FIG. 5 shows data for two different mud types and two different formation resistivities, along with data for a conductive steel casing. At zero standoff the phase is close zero, indicating no leakage. (On the casing, the phase at small standoffs is not zero because of noise). At a large standoff, the phase is −90°, indicating mainly leakage. A comparison of FIGS. 3A and 5 shows that a phase angle of −45° corresponds to the critical point where the calculated resistivity begins to increase as a result of the mud and pad signals becoming significant compared to the formation signal.

Additionally, the phase correction can be used with the scalar correction described in the Background. Using Equation 2 above, a resistivity can be calculated with a scalar correction, $\rho_{cor}$:

$$\rho_{cor} = ak\frac{\delta V}{I} \quad (15)$$

where a, a function of (V/I), is the correction factor derived from theoretical modeling or experiments, as outlined in patent WO 0177710.

As an example, $\rho_{cor}$ can be calculated as follows:

$$\rho_{cor} = k\frac{\delta V_{TRUE}}{I_F} \quad (16)$$

where $I_F$ is given by Equation 4 and $\delta V_{TRUE}$ by Equation 6. The phase correction can then be applied to the corrected resistivity to obtain a corrected phase resistivity, $\rho_{cph}$:

$$\rho_{cph} = \rho_{cor} \cdot \cos(\phi) \quad (17)$$

where $\phi$ is the phase of $\delta V$ with respect to the total current I.

Figure 6:
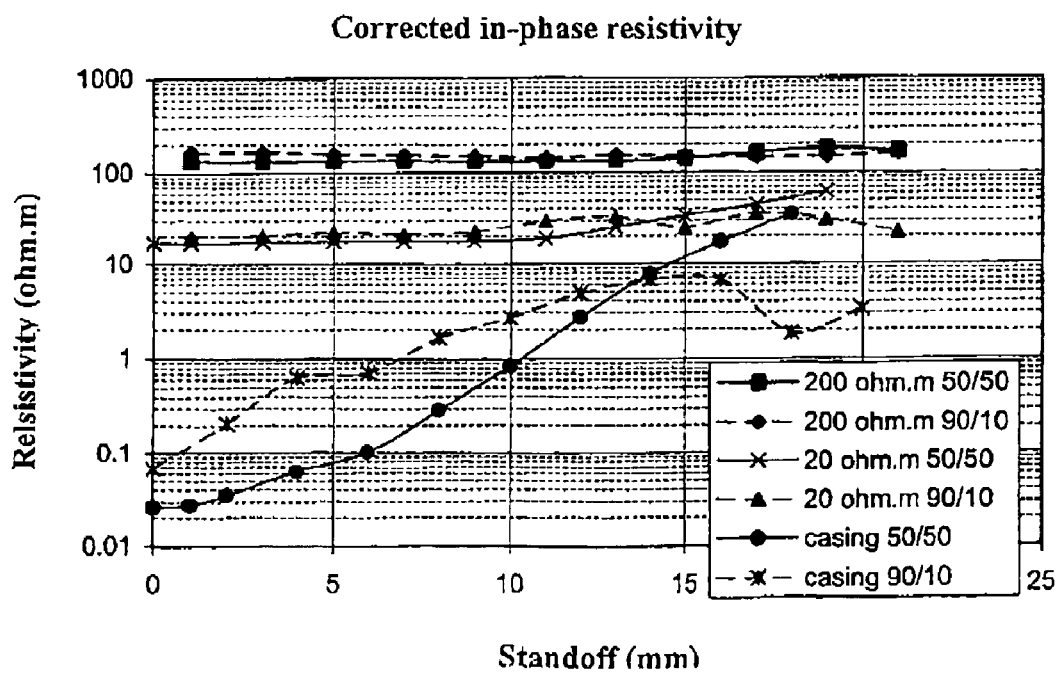
FIG. 6 is a graph of resistivity data using the component of the voltage in phase with the total current and using a scalar correction.

FIG. 6 shows the corrected phase resistivity according to the invention as a function of standoff. Advantageously, the rapid rise in measured resistivity caused by the pad and mud signals is attenuated, and the working zone of the tool is extended to greater standoffs.

Figure 7:
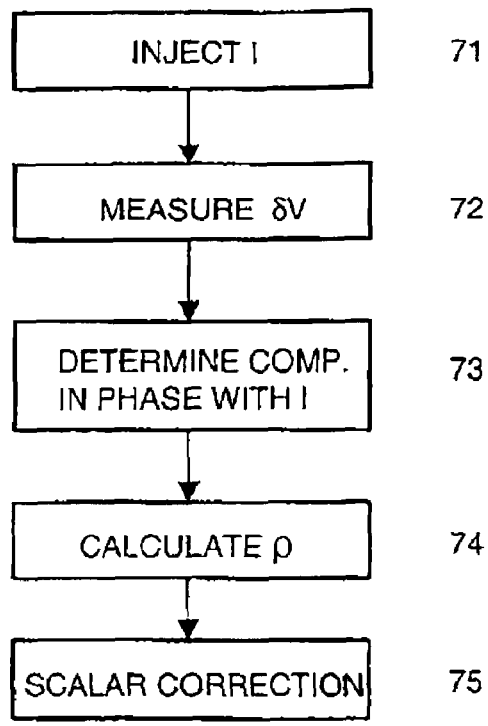
FIG. 7 is a flow chart showing an embodiment of the method according to the invention.

FIG. 7 shows the method according to the invention. Various principles discussed above are applied in several embodiments of the invention.

First, an alternating current with a frequency below about 100 kHz is injected into a formation, as shown in FIG. 7 at 71. The current is injected at a first position along the borehole wall and returns at a second position along the borehole wall. In some embodiments, the first and second position correspond to the positions of the source and return electrodes on the pad.

Next, a voltage is measured between a third position and a fourth position along the borehole wall, the third and fourth positions being located between the first and second positions 72. In some embodiments the third and fourth positions correspond to the positions of the differential electrodes on the pad.

The method then includes determining the amplitude of a component of the voltage that is in phase with the current 73. After determining the amplitude of the in phase component, the method includes calculating the resistivity of the formation 74, as shown in Equation 2. In some embodiments, the method includes determining a component of the voltage that is in phase with a formation current. The formation current is determined by subtracting a leakage current calculated using an experimentally determined leakage impedance.

In some embodiments, a scalar correction is applied for leakage and voltage inaccuracies 75. These corrections, shown in Equations 4 and 6, make the resistivity calculations more accurate in the range between zero standoff and the point where mud signal becomes dominant.

Figure 8:
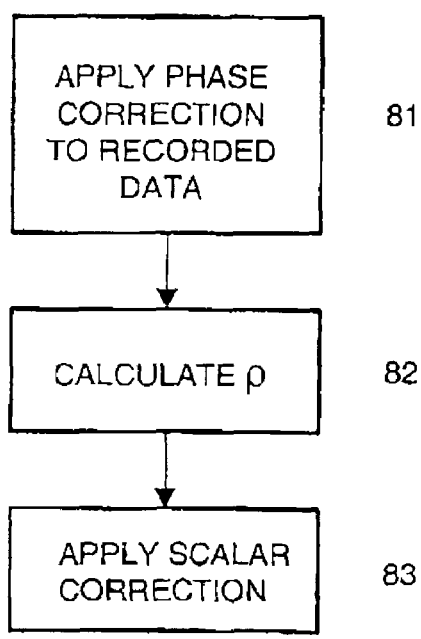
FIG. 8 is a flow chart showing another embodiment of the method according to the invention.

FIG. 8 shows yet another embodiment of the invention, wherein the determining of the in phase component is performed on previously recorded data. The embodiment includes determining the amplitude of a component of the recorded voltage in phase with the recorded current 81. The resistivity of the formation can then be calculated 82 using the above equations. Again, a scalar correction can be applied 83 to make the resistivity calculations more accurate between zero standoff and the point where the mud signal becomes dominant. In some embodiments, the method includes determining the magnitude of a component of the voltage that is in phase with the formation current.

Figure 1:
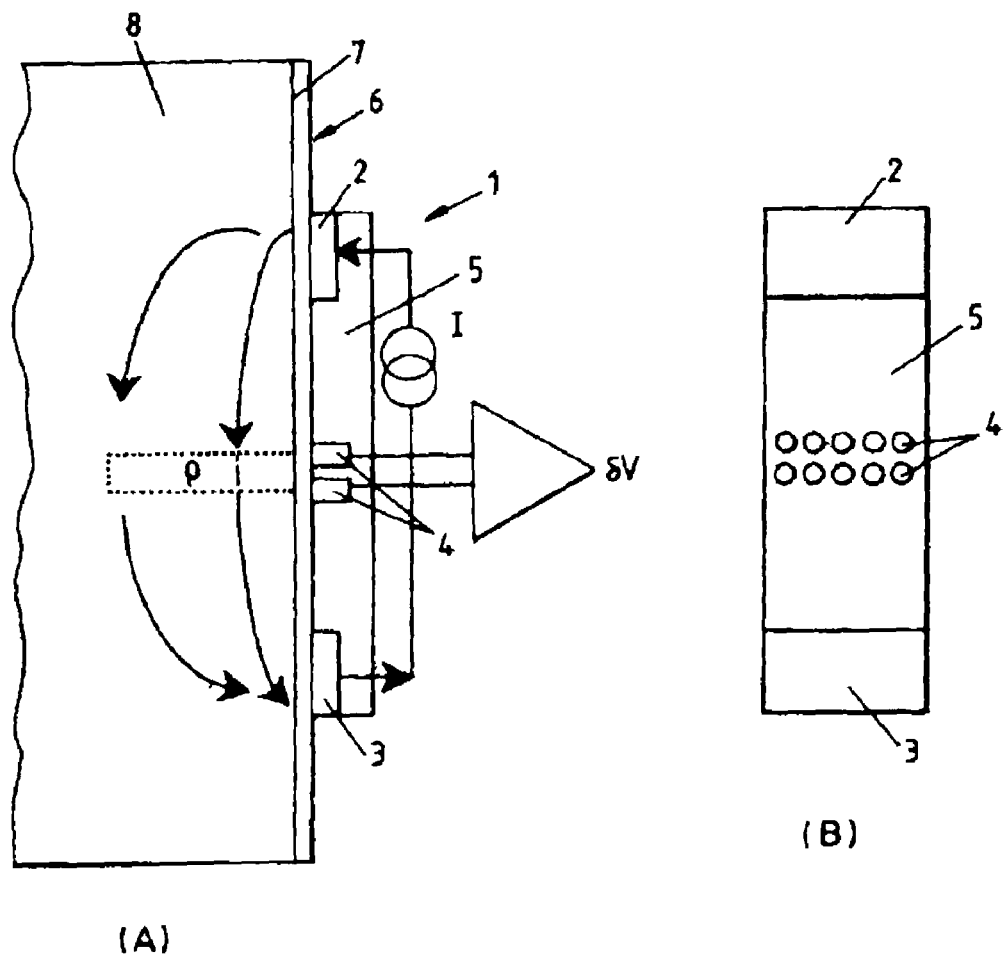
FIG. 1A shows a cross-section of a prior art tool in contact with the formation.
FIG. 1B is a view of the face of the tool shown in FIG. 1A.
Figure 2:
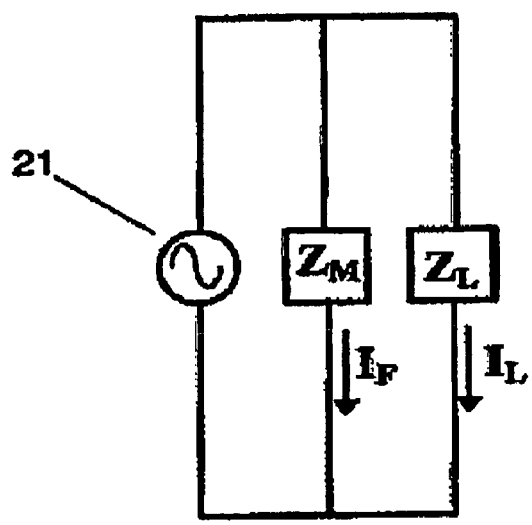
FIG. 2 is a circuit diagram of a model used in the prior art.
Figure 9A:
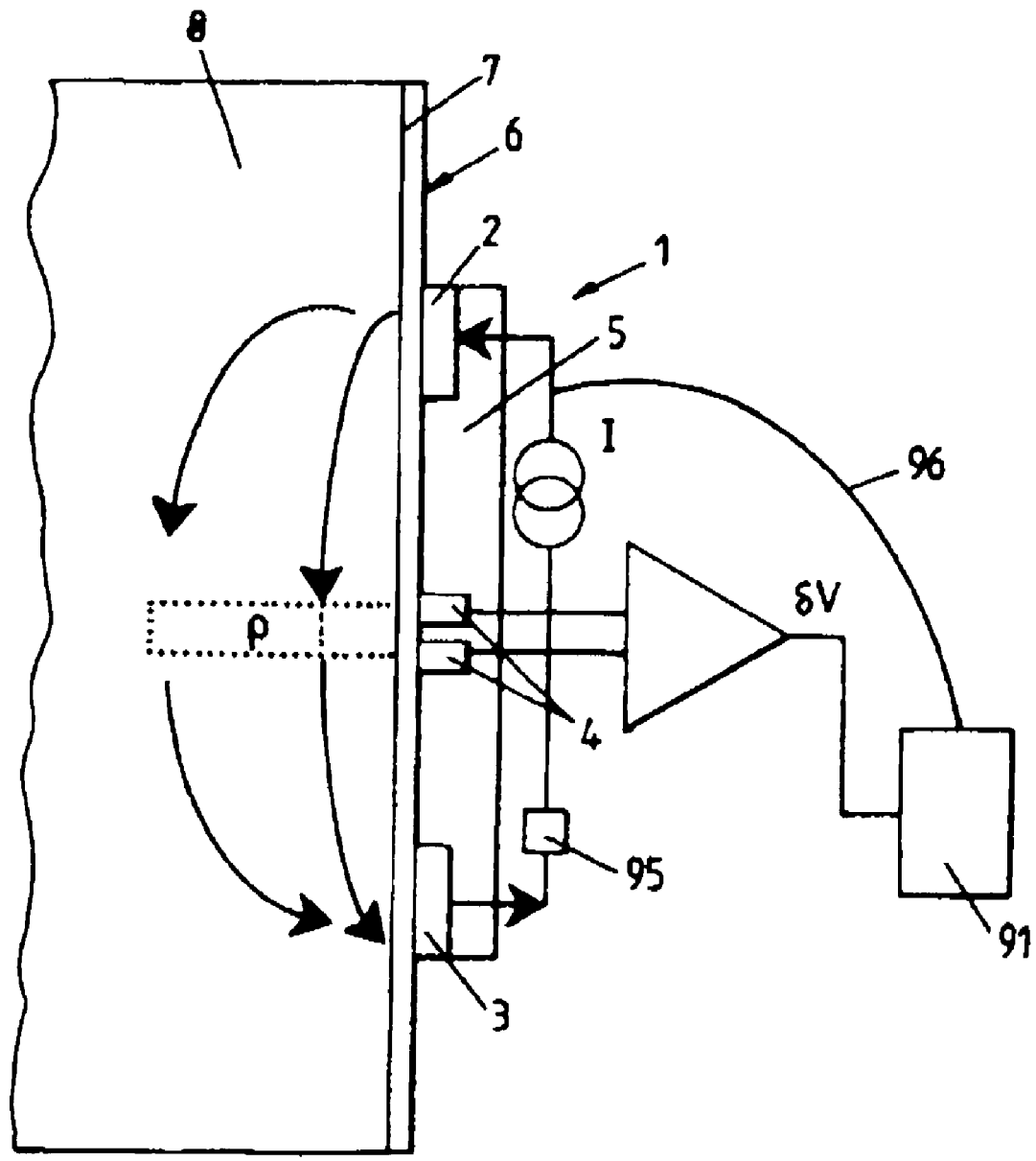
FIG. 9A shows the tool according to the invention with a phase sensitive measuring device.
Figure 9B:
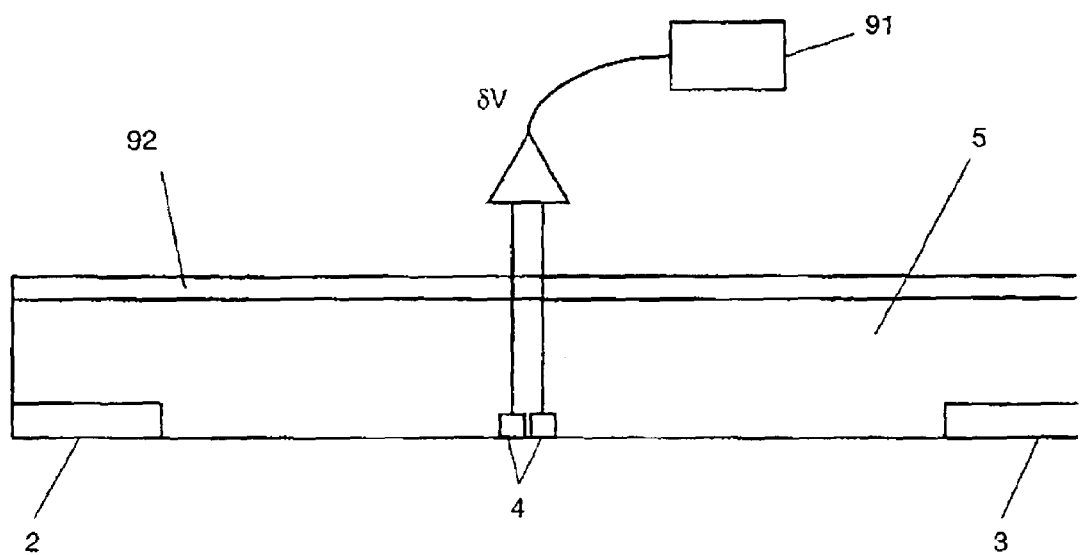
FIG. 9B shown the tool with a conductive backplate.

A well-logging tool according to the invention is shown schematically in FIGS. 9A & 9B. In FIG. 9A the tool 1 is similar to the prior art tool in FIG. 1 in that it has a source electrode 2, a return electrode 3, and voltage electrodes 4 located between the source 2 and return 3 electrodes. The tool according to the invention also has an ammeter 95 operatively connected to the source and return electrode circuit, the ammeter being adapted to measure the total current. The tool 1 also has a phase sensitive detector 91 that is adapted to measure the amplitude of the voltage that is in phase with the current, via a phase reference input 96.

FIG. 9B shows another embodiment of the tool according to the invention, where the tool has a non-conductive pad 5 with a conductive backplate 92. The tool also includes the phase sensitive detector 91 adapted to measure the amplitude of the voltage that is in phase with the current.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for micro electrically investigating a wall of a borehole filled with a non conductive fluid in a geologic formation, the method comprising:
    injecting a current into the formation at a first position along the wall and returning the current at a second position along the wall, the formation current having a frequency below about 100 kHz;
    measuring a voltage in the formation between a third position and a fourth position along the wall, the third and fourth positions being located between the first and second positions;
    wherein the method further comprises:
    calculating a formation current by subtracting a leakage current from the current; and
    determining an amplitude of a component of the voltage in phase with the formation current.

2. The method of claim 1 further comprising:
    calculating a formation resistivity from the current and the voltage component that is in phase with the current.

3. The method of claim 2, wherein calculating the formation resistivity includes applying scalar corrections for current leakage and voltage inaccuracies.

4. The method of claim 1, wherein the current is injected through a source electrode and returned at a return electrode, each of the source and return electrodes being shielded by a conductive box held at the same electric potential as each electrode, the method further comprising measuring the current.

5. The method of claim 1, wherein the amplitude determination step comprises determining an amplitude of a component of a recorded voltage signal in phase with a recorded current signal, the current signal recorded from a current injected into a formation at a first position along a borehole wall and returned at a second position along the wall, the voltage signal recorded from a voltage measured between a third position along the wall and a fourth position along the wall, the third and fourth positions being between the first and second positions.

6. The method of claim 5 further including:
    calculating a formation resistivity using the recorded current signal and the component of the recorded voltage signal in phase with the recorded current signal.

7. The method of claim 6 wherein calculating the formation resistivity includes applying a scalar correction for current leakage and voltage inaccuracies.

8. The method of claim 5 wherein the recorded current signal is a formation current that is a calculated by subtracting a leakage current from the total current, the leakage current being calculated by using an experimentally determined leakage impedance.

9. A well-logging tool for making micro electrical measurements in a borehole filled with a non conductive fluid comprising:
    a pad adapted to be placed into contact with a wall of the borehole;
    a source electrode located on the pad, the source electrode adapted to inject an electrical current into a formation;
    a return electrode located on the pad, the return electrode adapted to receive the electrical current injected by the source electrode;
    an ammeter operatively connected to a circuit including the source and return electrodes;
    at least one pair of voltage electrodes located on the pad between the source and the return electrodes;
    wherein the tool further comprises:
    a phase sensitive detector operatively coupled to the voltage electrodes and adapted to measure an amplitude of a component of a voltage across the voltage electrodes in phase with the electrical current.

10. The well-logging tool of claim 9, wherein the pad is comprised of a non-conductive material and further comprising:
    a conductive backplate disposed on a back face of the pad, and covering most of a region between the source and return electrodes.

11. The well-logging tool of claim 9, wherein the phase sensitive detector is operatively coupled to the voltage electrodes and adapted to measure an amplitude of a component of a voltage across the voltage electrodes in phase with a calculated formation current.

* * * * *